(12) United States Patent
Yan (10) Patent No.: US 8,827,012 B1
(45) Date of Patent: Sep. 9, 2014

(54) AUTOMATED CLEAN MACHINE WITH A STEERING MECHANISM

(71) Applicant: Jason Yan, New Taipei (TW)

(72) Inventor: Jason Yan, New Taipei (TW)

(*) Notice: Subject to any disclaimer, the term of this patent is extended or adjusted under 35 U.S.C. 154(b) by 94 days.

(21) Appl. No.: 13/771,984

(22) Filed: Feb. 20, 2013

(51) Int. Cl.
*B62D 6/00* (2006.01)
*A47L 11/40* (2006.01)

(52) U.S. Cl.
CPC .................... *A47L 11/4061* (2013.01)
USPC ............................................. 180/6.2; 15/319

(58) Field of Classification Search
None
See application file for complete search history.

(56) References Cited

U.S. PATENT DOCUMENTS

| | | | | |
|---|---|---|---|---|
| 5,771,987 | A * | 6/1998 | Marbach | 180/6.66 |
| 7,248,951 | B2 * | 7/2007 | Huldén | 701/23 |
| 8,001,651 | B2 * | 8/2011 | Chang | 15/319 |
| 2004/0143927 | A1 * | 7/2004 | Haegermarck et al. | 15/319 |
| 2008/0282494 | A1 * | 11/2008 | Won et al. | 15/319 |
| 2013/0061416 | A1 * | 3/2013 | Dyson et al. | 15/319 |

* cited by examiner

*Primary Examiner* — Tony Winner
(74) *Attorney, Agent, or Firm* — Chun-Ming Shih (57) ABSTRACT

The present invention provides an automated clean machine with a steering mechanism wherein the steering mechanism of the automated clean machine which gets held up restricts one of conjoint wheels not to synchronously rotate in contrast to the other one during a steering process, minimizing wheel wear, and resuming the wheels' synchronous running in next normal movement.

9 Claims, 8 Drawing Sheets

AUTOMATED CLEAN MACHINE WITH A STEERING MECHANISM

BACKGROUND OF THE INVENTION

1. Field of the Invention

The present invention is an automated clean machine, particularly an automated clean machine with a steering mechanism.

2. Description of the Prior Art

The light compact tools with automated smart functions have been emerging in small-sized dwelling houses which emphasize effective utilization of home environment or space in cozy harmonious atmosphere, for example, a self-propelled automated clean machine as an alternative modern automated clean device replacing vacuums and electrically conducting floor cleaning.

A current self-propelled automated clean machine features two wheels on its base whose forward and backward motions are controlled by a driving motor which allows the automated clean machine getting held up to counterclockwise (clockwise) rotate locally with the motor-driven left wheel (right wheel) and the right one (left one) turning reversely and forward, respectively. This design in an actual product, however, still fails to avoid some barriers such as corner of wall which may overheat a motor in virtue of a wheel shaft locked. In addition, each of the automated clean machine's two wheels, which are synchronously driven by a drive motor for a unidirectional rotation only, cannot complete a reverse rotation independently during the automated clean machine' steering process, i.e., a wheel's rotation is always contrary to the automated clean machine's steering motion and deteriorates wear that deserve to be corrected.

SUMMARY OF THE INVENTION

The present invention provides an automated clean machine with a steering mechanism which comprises a base, a steering mechanism, and a retarding mechanism: the base has a recess externally; the retarding mechanism installed at an inner side of the base and opposite to the recess comprises a spindle, which links the steering mechanism by passing through the recess; the steering mechanism held in the recess is driven by the retarding mechanism for rotating conjoint wheels, one of which is restricted to be not actuated synchronously during a steering process of the steering mechanism.

In the present invention, the steering mechanism comprises a first driving component, a limiting base, a limiting cap, a steering shaft and at least a brake unit: the first driving component is coupled with the spindle; the limiting base is situated between the first driving component and the recess; the steering shaft is coupled with a second driving component engaging the first driving component and provided with a steering disc at one side; the limiting cap and the limiting base which are integrated with each other encase the steering shaft, the first driving component, and the second driving component, keeping the steering shaft between the limiting cap and the limiting base as well as the steering disc outside the limiting cap and the limiting base; each of the wheels consists of a rim connected to one side of the steering shaft and a wear-resistant cover tire laterally installed around the rim; the brake unit which is held between one of the two rims and the steering disc restricts the corresponding rim not to rotate synchronously in contrast to the other unrestricted rim during a steering process of the steering mechanism.

In the present invention, the steering disc has a plurality of braking grooves; the rim is designed to have a plurality of permanent grooves; each of the brake units comprises a spring and a brake pin with a shank and a top whose one end corresponds to and resists one of the braking grooves and the other end links the shank externally held in the spring and jointly inserted into one of the permanent grooves.

In the present invention, the steering disc has a plurality of braking grooves; the rim has a permanent groove at its inner side; the brake unit consists of a spring and a brake disc with one side on which there are a plurality of bumps corresponding to and resisting the braking grooves and the other side contacting the spring and held in the permanent groove.

The present invention further comprises an untangling collar held in the recess, surrounding the steering mechanism, and comprising at least a clamping hook peripherally which extends toward an inner side of the base wherein the recess has indentations opposite to the clamping hooks. According to the above disclosure, the automated clean machine's left and right wheels run synchronously during a normal movement but asynchronously during a steering process of the automated clean machine impeded by any barrier in order to avoid the barrier, prevent the wheels from wear, and resume the two wheels' normal synchronous motion finally. The present invention has the untangling collar moved downward at the indentations to mask the wheels partially and minimize a possibility of wheels tangled by any wire.

These features and advantages of the present invention will be fully understood and appreciated from the following detailed description of the accompanying Drawings.

BRIEF DESCRIPTION OF THE DRAWINGS

FIG. 3-1 is a partial exploded view of the present invention of an automated clean machine with a steering mechanism.

FIG. 3-2 is a further partial exploded view of FIG. 3-1 in the present invention of an automated clean machine with a steering mechanism.

FIG. 3-3 is an another partial exploded view of the present invention of an automated clean machine with a steering mechanism.

FIG. 3-4 is a further partial exploded view of FIG. 3-3 in the present invention of an automated clean machine with a steering mechanism.

DETAILED DESCRIPTION OF THE PREFERRED EMBODIMENT

Referring to FIG. 1 through FIG. 6 which illustrate the present invention of an automated clean machine with a steering mechanism comprises a base 1, a recess 5, a steering mechanism 2, a retarding mechanism 3, an untangling collar 4, a spindle 6, wheels 26, clamping hooks 40, and indentations 50.

In the present invention, the base 1 has the recess 5 externally; the steering mechanism 2 is held in the recess 5; the retarding mechanism 3 installed at an inner side of the base 1 and opposite to the recess 5 comprises the spindle 6, which links the steering mechanism 2 by passing through the recess 5, and drives the steering mechanism 2 and the wheels 26 to rotate; the steering mechanism 2 restricts one of the two wheels 26 not to synchronously rotate during a steering process based on the wheels 26; the untangling collar 4 held in the recess 5 is used to surround the steering mechanism 2 as well as avoid any foreign object to be drawn into the steering mechanism 2 and comprises at least a clamping hook 40 peripherally which extends toward an inner side of the base 1; the recess 5 comprises the indentations 50 opposite to the clamping hooks 40.

Referring to FIG. 3-1 through FIG. 3-4 which illustrate the steering mechanism 2 comprises a first driving component 21, a second driving component 27, a limiting base 22, a limiting cap 23, a steering shaft 24, a steering disc 241, braking grooves 2411, and a number of brake units 25.

As shown in FIG. 3-1 through FIG. 3-4, the first driving component 21 is coupled with the spindle 6; the limiting base 22 is situated between the first driving component 21 and the recess 5; the steering shaft 24 is connected to the second driving component 27 which links the first driving component 21 to drive and rotate the steering shaft 24 on which there is the steering disc 241 at one end. The limiting cap 23 and the limiting base 22 which are integrated with each other encase the steering shaft 24, the first driving component 21 and the second driving component 27, keeping the steering shaft 24 between the limiting cap 23 and the limiting base 22 as well as the steering disc 241 outside the limiting cap 23 and the limiting base 22; each of the two wheels 26 consists of a cover tire 261 and a rim 262: the two rims 262 are mounted at both ends of the steering shaft 24; the cover tire 261 is laterally integrated with the rim 262; the brake units 25 which are held between one of the two rims 262 and the steering disc 241 restrict the corresponding rim 262 not to synchronously rotate in contrast to the other unrestricted rim 262 during a steering process of the steering mechanism 2.

Figure 31:
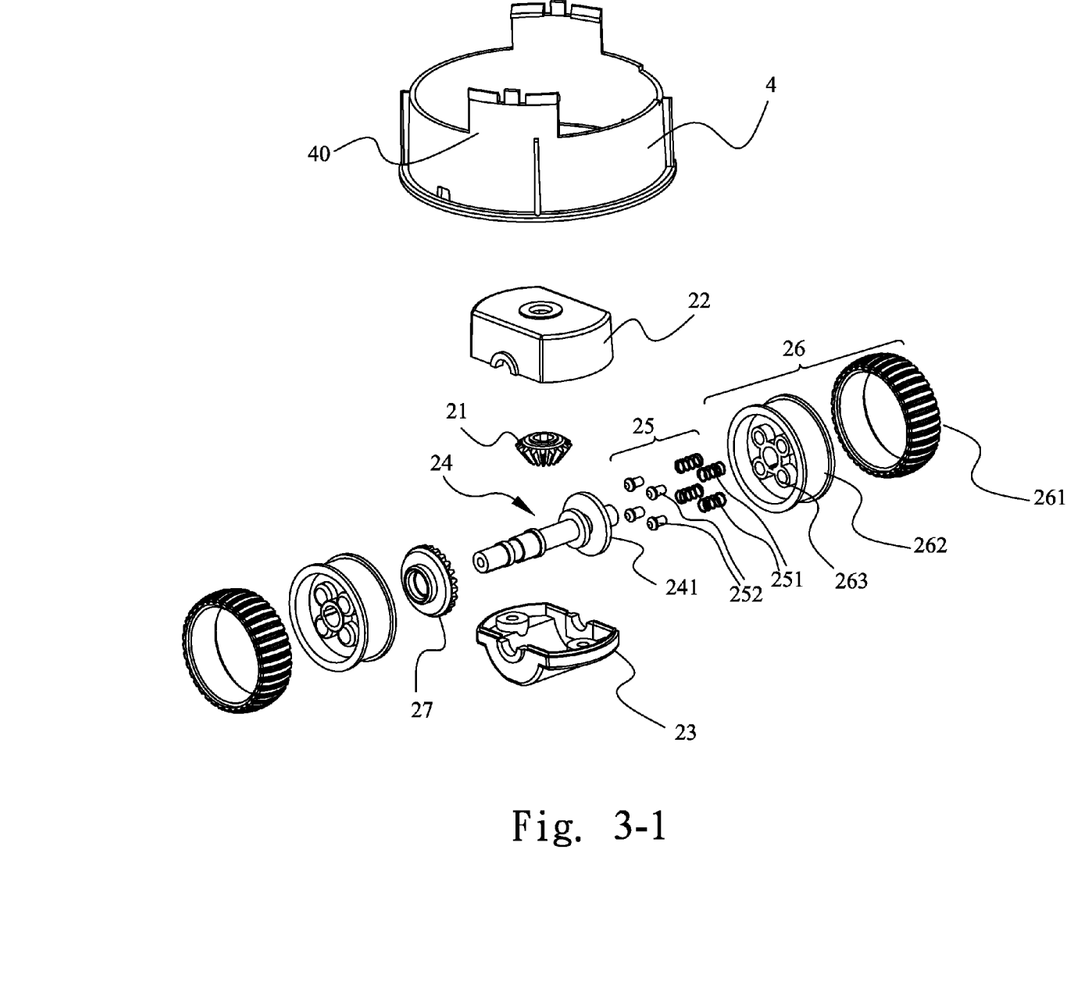
Figure 32:
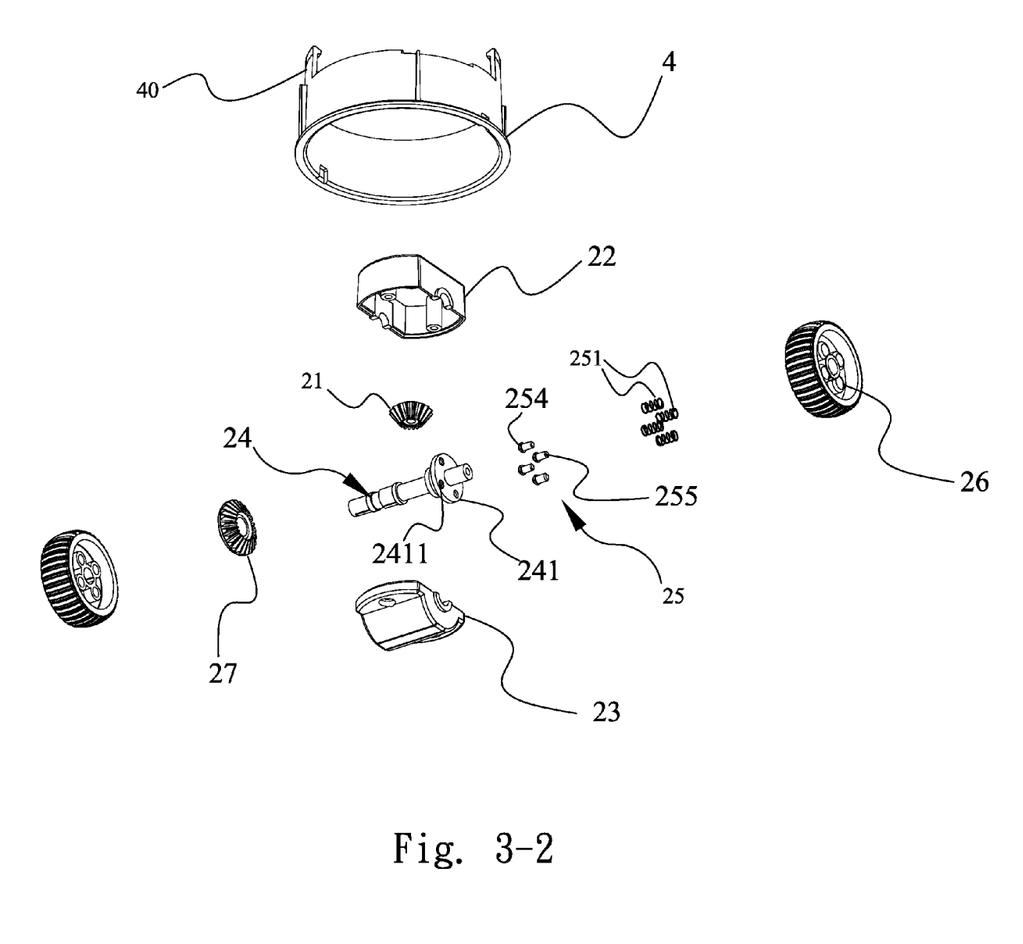

As shown in FIG. 3-1 and FIG. 3-2, the rim 262 facing the steering disc 241 comprises a plurality of permanent grooves 263 internally; the steering disc 241 has a plurality of braking grooves 2411; each of the brake units 25 consists of a spring 251 and a brake pin 252 with a top 254 and a shank 255 wherein the top 254 has one end corresponding to and resisting one of the braking grooves 2411 and the other end connecting the shank 255 which is externally held by the spring 251 and inserted into one of the permanent grooves 263.

Figure 33:
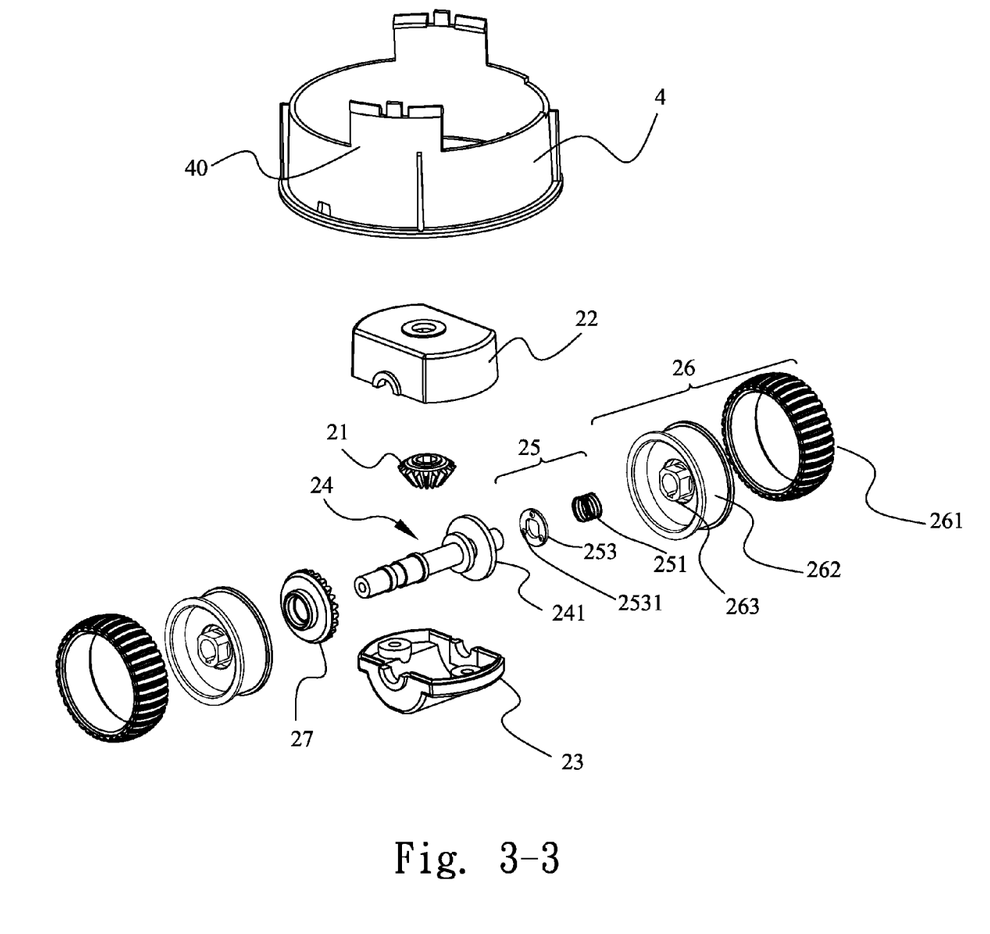
Figure 34:
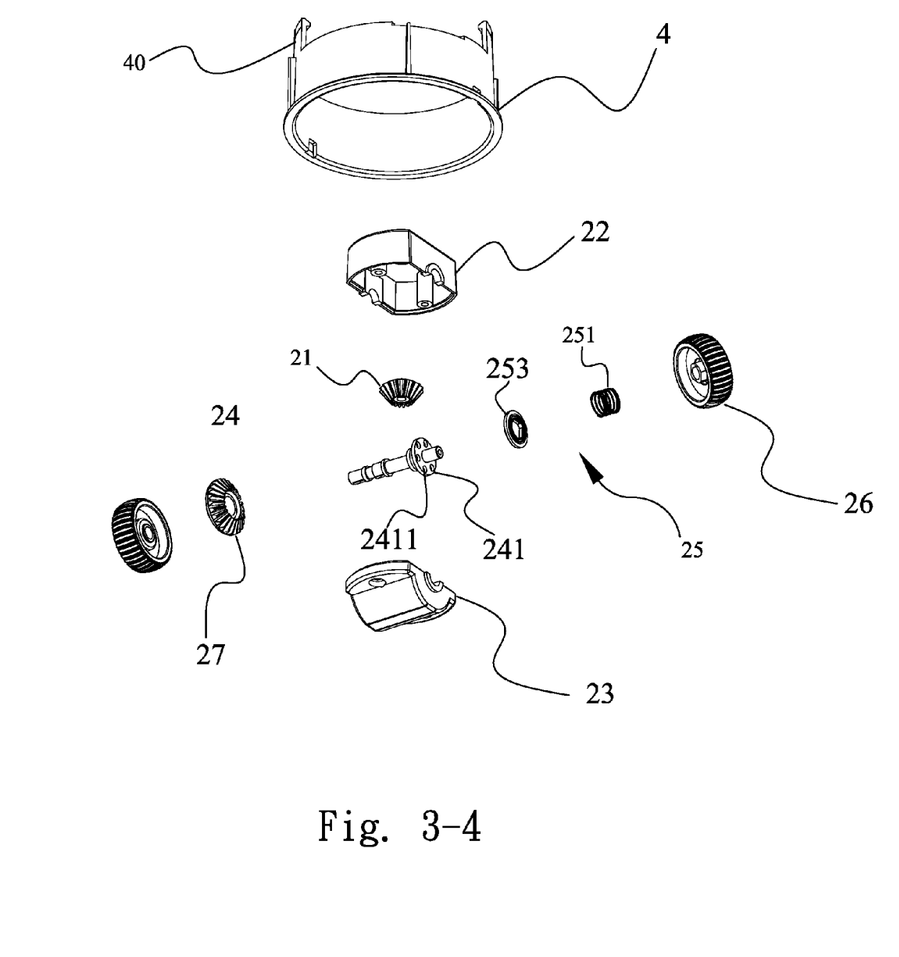

As shown in FIG. 3-3 and FIG. 3-4, the steering disc 241 has a plurality of braking grooves 2411; the rim 262 facing the steering disc 241 is designed to have a permanent groove 263 internally; the brake unit 25 comprises a spring 251 and a brake disc 253 with one side on which there are a plurality of bumps 2531 corresponding to and resisting the braking grooves 2411 and the other side contacting the spring 251 and jointly held in the permanent groove 263.

The present invention which provides an automated clean machine with a steering mechanism is characteristic of internal design of the steering mechanism 2: the automated clean machine is driven by the two wheels synchronously in normal running; the automated clean machine impeded by any barrier is driven by the two wheels asynchronously to rotate horizontally, gets rid of the barrier without wear of the wheels, and finally resumes its normal running with the two wheels running synchronously.

Figure 1:
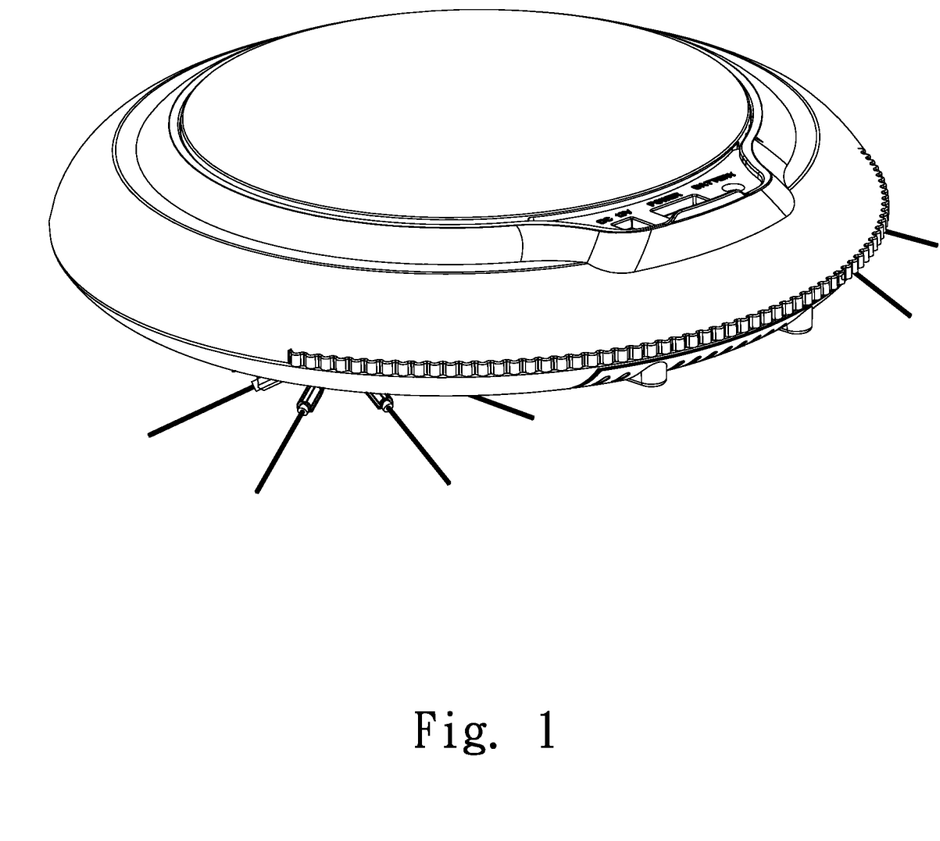
FIG. 1 is a schematic perspective view of the present invention of an automated clean machine with a steering mechanism.
Figure 2:
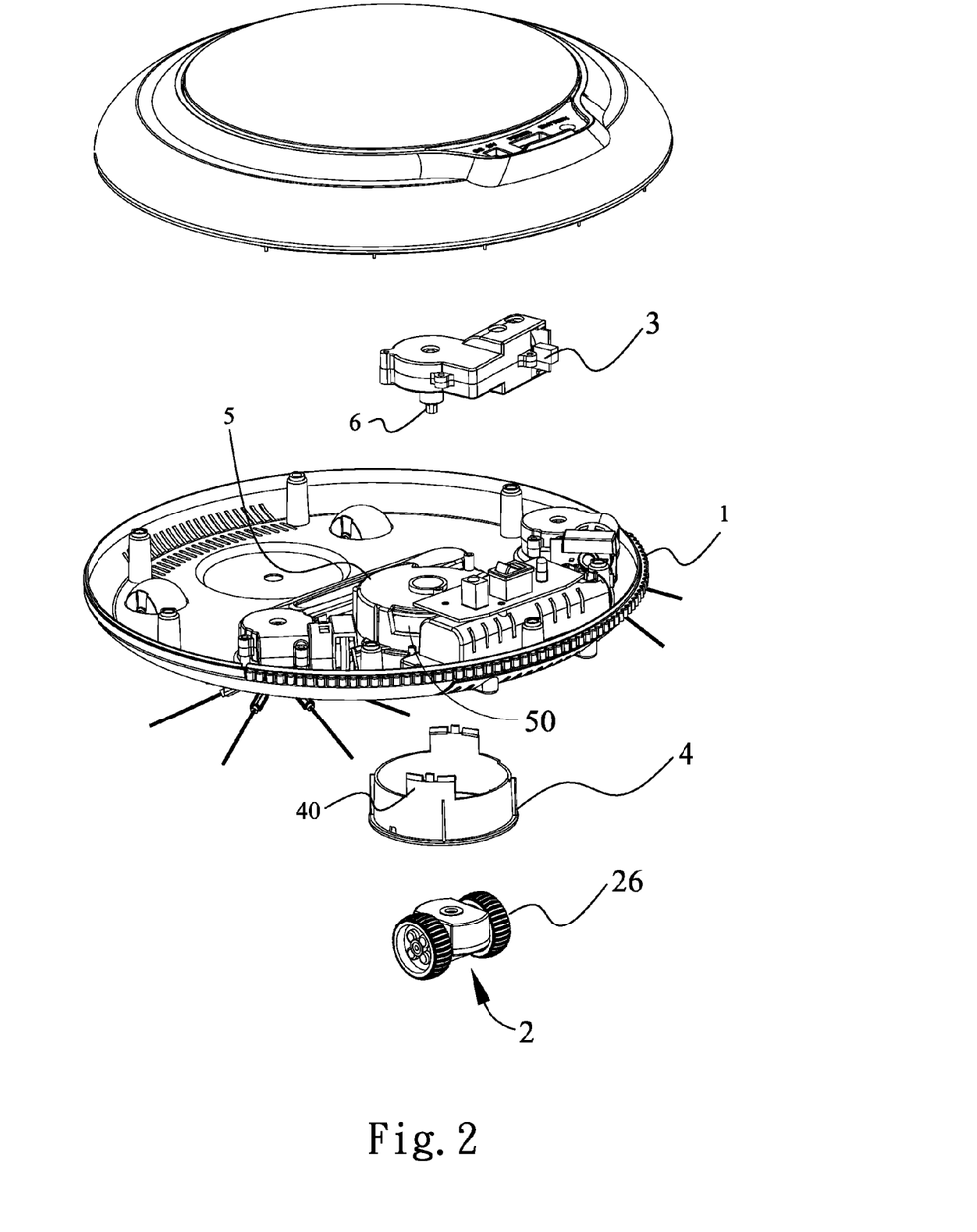
FIG. 2 is a schematic exploded view of the present invention of an automated clean machine with a steering mechanism.
Figure 4:
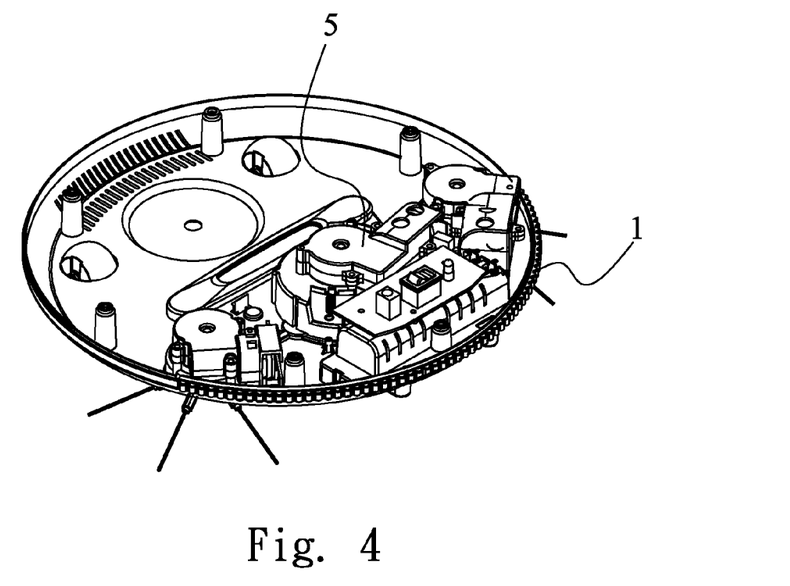
FIG. 4 is a schematic view illustrating the inside of the base in the present invention of an automated clean machine with a steering mechanism.
Figure 5:
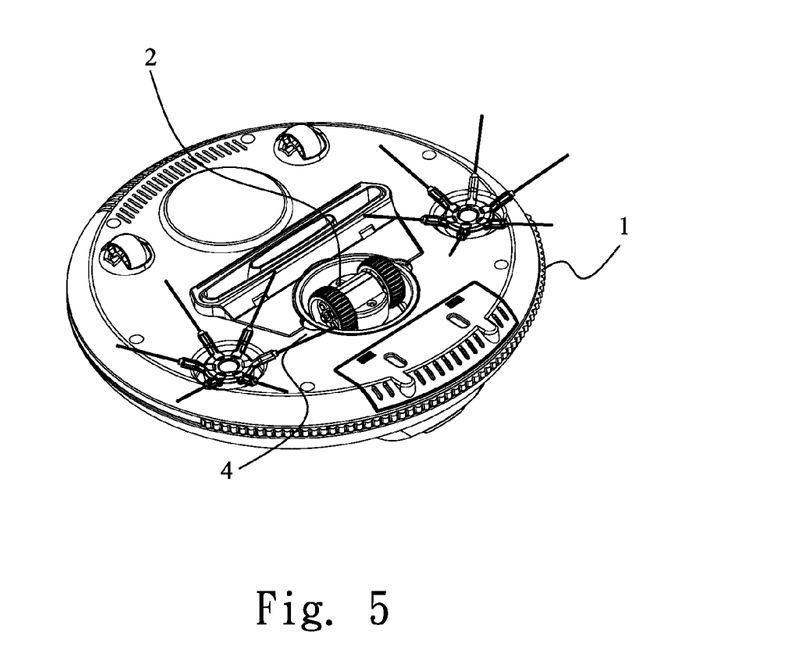
FIG. 5 is a schematic view illustrating the back of the base in the present invention of an automated clean machine with a steering mechanism.
Figure 6:
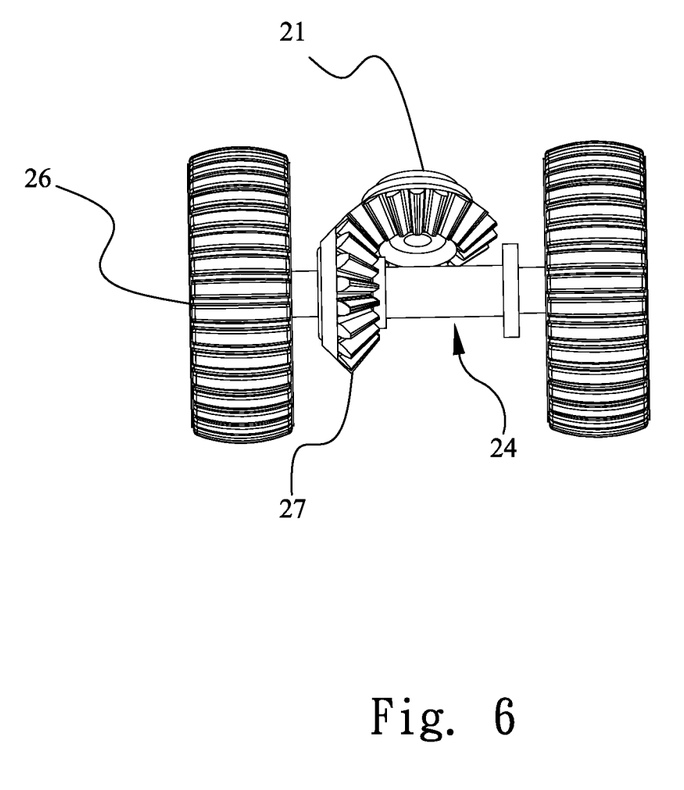
FIG. 6 is a schematic view illustrating a partial steering mechanism in the present invention of an automated clean machine.

Referring to FIG. 4 which is a partial schematic view illustrating the steering mechanism 2 of the present invention. The retarding mechanism 3 and the spindle 6 create a torsional moment which is used to drive and rotate the first driving component 21 by the retarding mechanism 3 through the spindle 6; the first driving component 21 and the second driving component 27 creates an engaging force which is applied on an eccentric position at the steering shaft 24 and makes the steering shaft 24 rotate about its own axis and revolve around the spindle 6.

In the above structural design, the wheels 26 of the automated clean machine running on the ground surface press a floor firmly under effect of gravity, which causes friction applied on the wheels 26 and obstructing revolution of the steering shaft 24 around the spindle 6, but still are driven by the steering shaft 24 and the conjoint spindle 6 to advance the automated clean machine forward. When the automated clean machine gets held up due to any barrier, the spindle 6 keeps running and makes a drive component (e.g., DC motor) which is coupled with the retarding mechanism 3 overloaded, that is, lowered RPM, fast increased current and higher torsional moment output, all of which contribute to a yawing moment greater than friction on the wheels 26 firmly pressing the floor and allow the steering shaft 24 to revolve around the spindle 6. As such, the automated clean machine changes its direction of movement, avoiding the barrier, completing one turning automatically, and resuming its rectilinear motion without influence of any drag.

When the automated clean machine changes its direction of movement to avoid any barrier by revolving the steering shaft 24 around the spindle 6, the brake unit 25, which is held between one of the rims 26 and the steering disc 241 and similar to an automobile's clutch, temporarily separates both the rim 261 and the wheel 26 facing the steering disc 241 from the steering disc 241 and makes the wheel 26 beside the steering disc 241 not rotate with the steering shaft 24. As such, the cover tire 261 on the wheel 26 which is not driven by the steering disc 241 suffers minimized frictional loss; the automated clean machine's rectilinear motion is resumed by normal friction repeatedly applied on the wheel 26 beside the steering disc 241 when the steering disc 241 joins and drives the rim 262.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An automated clean machine with a steering mechanism, comprising:
   a base with a recess externally;
   a retarding mechanism installed at an inner side of said base, corresponding to said recess and comprising a spindle passing through said recess;
   a steering mechanism held in said recess, coupled with said spindle, and driven by said retarding mechanism through said conjoint spindle; and
   a plurality of wheels connected to said steering mechanism wherein one of said wheels is not driven synchronously during a steering process.

2. The automated clean machine with a steering mechanism according to claim 1 wherein each of said plurality of wheels consists of a rim and a cover tire binding said rim's edge;
   said steering mechanism further comprises:
   a first driving component coupled with said spindle;

a limiting base installed between said first driving component and said recess;

a steering shaft coupled with said two rims at its both ends and a second driving component which is situated between said steering shaft's both ends and engages said first driving component at an eccentric position of said steering shaft and comprising a steering disc at one end on which a plurality of braking grooves are opened;

a limiting cap connected to said limiting base, encasing said steering shaft, said first driving component and said second driving component in a space located between said limiting cap and limiting base and passed through by said steering shaft, and keeping said steering disc outside said limiting cap and said limiting base; and at least a brake unit held between one of said rims and said steering disc and restricting one of said rims, which corresponds to said brake unit, as well as a conjoint wheel not to synchronously rotate during a steering process of said steering mechanism.

3. The automated clean machine with a steering mechanism according to claim 2 wherein said steering disc has a plurality of braking grooves, said rim corresponding to said brake unit has a plurality of permanent grooves at its inner side, and said brake unit comprises:

a brake pin with a shank and a top whose one end resisting one of said braking grooves and the other end linking said shank; and a spring externally surrounding said shank and jointly inserted into one of said permanent grooves.

4. The automated clean machine with a steering mechanism according to claim 2 wherein said steering disc has a plurality of braking grooves, one of said rims corresponding to said brake unit has a permanent groove at its inner side, and said brake unit comprises:

a brake disc with a plurality of bumps at one side corresponding to and resisting said braking grooves; and a spring contacting said brake disc's other side and held in said permanent groove.

5. The automated clean machine with a steering mechanism according to claim 2 wherein said retarding mechanism and said spindle create a torsional moment in between by which said retarding mechanism drives and rotates said first driving component through said spindle, and said first driving component and said second driving component generate an engaging force which is applied on an eccentric position at said steering shaft and makes said steering shaft rotate about its own axis and revolve around said spindle.

6. The automated clean machine with a steering mechanism according to claim 5 wherein said automated clean machine presses said wheels on a floor firmly under effect of gravity, which causes friction applied on said wheels and obstructing revolution of the steering shaft around said spindle, and said steering shaft driven by said spindle still actuate said wheels to rotate and said automated clean machine to move forward.

7. The automated clean machine with a steering mechanism according to claim 6 wherein said spindle of said automated clean machine getting held up due to any barrier still keeps running, increases torsional moment output which contributes to a yawing moment for revolution of said steering shaft about said spindle greater than friction on said wheels firmly pressing said floor, allows said steering shaft to revolve around said spindle for completion of one automatic turning, and makes said automated clean machine resume its rectilinear motion with drags disappearing.

8. The automated clean machine with a steering mechanism according to claim 7 wherein said brake unit separates said rim and its conjoint wheel, both of which face said steering disc, from said steering disc due to stronger friction applied on said wheel's cover tire and restricts said wheel not to rotate with said steering shaft when said automated clean machine changes its direction of movement to avoid any barrier by revolving said steering shaft around said spindle.

9. The automated clean machine with a steering mechanism according to claim 1 further comprises an untangling collar which is held in said recess, surround said steering mechanism, and comprises at least a clamping hook peripherally that extends toward an inner side of said base and said recess comprises indentations opposite to said clamping hooks.

* * * * *